United States Patent
Kim

(10) Patent No.: US 12,491,873 B2
(45) Date of Patent: Dec. 9, 2025

(54) DRIVING ASSISTANCE DEVICE AND CONTROLLING METHOD THEREOF

(71) Applicant: HL KLEMOVE CORP., Incheon (KR)

(72) Inventor: Moogab Kim, Gyeonggi-do (KR)

(73) Assignee: HL KELMOVE CORP., Incheon (KR)

( * ) Notice: Subject to any disclaimer, the term of this patent is extended or adjusted under 35 U.S.C. 154(b) by 76 days.

(21) Appl. No.: 18/619,220

(22) Filed: Mar. 28, 2024

(65) Prior Publication Data

US 2025/0018937 A1 Jan. 16, 2025

(30) Foreign Application Priority Data

Jul. 14, 2023 (KR) .................. 10-2023-0091609

(51) Int. Cl.
*G06F 17/00* (2019.01)
*B60W 30/09* (2012.01)
(Continued)

(52) U.S. Cl.
CPC ...... *B60W 30/09* (2013.01); *B60W 30/18163* (2013.01); *B60W 50/14* (2013.01);
(Continued)

(58) Field of Classification Search
CPC .......... B60W 30/09; B60W 30/18163; B60W 50/14; B60W 2420/403; B60W 2420/408;
(Continued)

(56) References Cited

U.S. PATENT DOCUMENTS 9,262,915 B2 * 2/2016 Clem .................. G08G 1/08
10,652,735 B2 * 5/2020 Li ....................... G08B 5/222
(Continued)

FOREIGN PATENT DOCUMENTS

CN 117355451 A * 1/2024
CN 119343712 A * 1/2025 .......... B60W 30/095
(Continued)

OTHER PUBLICATIONS

Understanding ADAS: Collision Avoidance (Year: 2024).*

*Primary Examiner* — Ronnie M Mancho
(74) *Attorney, Agent, or Firm* — WOMBLE BOND DICKINSON (US) LLP

(57) ABSTRACT

Disclosed herein is a driving assistance device including one or more sensors included in a vehicle, and having a sensing field of view facing outward from the vehicle; and a processor operably connected to the one or more sensors, wherein the processor is configured to: identify a drivable area of the vehicle based on one or more output signals of the one or more sensors in response to execution of an emergency stop function of the vehicle; determine, based on the one or more output signals of the one or more sensors, whether the identified drivable area of the vehicle corresponds to a first area where at least one of parking or stopping of the vehicle is permitted or a second area where the parking and the stopping of the vehicle are prohibited; and output a signal to control the vehicle to stop in the identified drivable area corresponding to the first area where at least one of the parking or the stopping of the vehicle is permitted in response to determination that the identified drivable area of the vehicle corresponds to the first area.

20 Claims, 5 Drawing Sheets

(51) Int. Cl.
   *B60W 30/18*   (2012.01)
   *B60W 50/14*   (2020.01)
(52) U.S. Cl.
   CPC . *B60W 2420/403* (2013.01); *B60W 2420/408* (2024.01); *B60W 2552/10* (2020.02); *B60W 2552/53* (2020.02); *B60W 2555/60* (2020.02)
(58) Field of Classification Search
   CPC ......... B60W 2552/10; B60W 2552/53; B60W 2555/60; B60W 10/04; B60W 10/18; B60W 10/20; B60W 30/18009; B60W 40/02; B60Q 2300/142; B60Y 2300/18141; B60Y 2400/3015; B60Y 2400/3017
   USPC .......................................................... 701/26
   See application file for complete search history.

(56) References Cited

U.S. PATENT DOCUMENTS

| | | | | |
|---|---|---|---|---|
| 11,812,258 | B2 * | 11/2023 | Li | H04W 8/205 |
| 12,033,508 | B2 * | 7/2024 | Kim | G08G 1/144 |
| 12,117,833 | B2 * | 10/2024 | Thakur | G01C 21/3438 |
| 12,277,779 | B2 * | 4/2025 | Asghar | A61B 5/0533 |
| 12,358,507 | B2 * | 7/2025 | Jardine | B60W 30/143 |
| 2022/0383743 | A1 * | 12/2022 | Oren | G08G 1/096725 |
| 2023/0150538 | A1 * | 5/2023 | Foster | B60W 60/0016 |
| | | | | 701/23 |
| 2023/0264713 | A1 * | 8/2023 | Foster | G01C 21/3848 |
| | | | | 701/24 |
| 2023/0280183 | A1 * | 9/2023 | Hayat | G01C 21/3819 |
| | | | | 701/423 |
| 2024/0054793 | A1 * | 2/2024 | Imai | G06V 20/586 |
| 2024/0228163 | A1 * | 7/2024 | Taniguchi | B65G 43/08 |
| 2024/0294115 | A1 * | 9/2024 | Komatsu | G09G 5/38 |
| 2024/0363007 | A1 * | 10/2024 | Kim | G08G 1/017 |

FOREIGN PATENT DOCUMENTS

| | | |
|---|---|---|
| JP | 7388208 B2 * | 11/2023 |
| KR | 10-1915167 | 11/2018 |
| KR | 10-2020-0106131 | 9/2020 |
| KR | 10-2021-0005764 | 1/2021 |

* cited by examiner

DRIVING ASSISTANCE DEVICE AND CONTROLLING METHOD THEREOF

CROSS-REFERENCE TO RELATED APPLICATION

This application claims the benefit of Korean Patent Application No. 10-2023-0091609, filed on Jul. 14, 2023 in the Korean Intellectual Property Office, the disclosure of which is incorporated herein by reference.

BACKGROUND

1. Field

Embodiments of the present disclosure relate to a driving assistance device and controlling method thereof.

2. Description of the Related Art

In modern society, vehicles have become the most common means of transportation, with an increasing number of people relying on them. While advancements in automotive technology have made long-distance travel more convenient and improved overall quality of life, they have also led to worsening traffic conditions, particularly in densely populated areas like South Korea.

Recent research has been focusing on vehicles equipped with Advanced Driver Assistance Systems (ADAS). These systems actively provide information about the vehicle's condition, the driver's state, and the surrounding environment to mitigate the driver's burden and enhance convenience.

Examples of such systems include Lane Departure Warning (LDW), Lane Keeping Assist (LKA), High Beam Assist (HBA), Autonomous Emergency Braking (AEB), Traffic Sign Recognition (TSR), Adaptive Cruise Control (ACC), and Blind Spot Detection (BSD).

However, current ADAS technologies do not include features that automatically park or stop the vehicle in a suitable space in the event of emergency situations need to stop the vehicle. This is a gap that has yet to be addressed in the development of advanced driving assistance systems.

SUMMARY

Therefore, it is an aspect of the present disclosure to provide a driving assistance device and controlling method thereof, which are capable of automatically stopping a vehicle in a parking and/or stopping area in the event of an emergency need to stop the vehicle.

Additional aspects of the disclosure will be set forth in part in the description which follows and, in part, will be obvious from the description, or may be learned by practice of the disclosure.

In accordance with one aspect of the present disclosure, a driving assistance device includes one or more sensors included in a vehicle, and having a sensing field of view facing outward from the vehicle, and a processor operably connected to the one or more sensors, wherein the processor is configured to identify a drivable area of the vehicle based on one or more output signals of the one or more sensors in response to execution of an emergency stop function of the vehicle, determine, based on the one or more output signals of the one or more sensors, whether the identified drivable area of the vehicle corresponds to a first area where at least one of parking or stopping of the vehicle is permitted or a second area where the parking and the stopping of the vehicle are prohibited, and output a signal to control the vehicle to stop in the identified drivable area corresponding to the first area where at least one of the parking or the stopping of the vehicle is permitted in response to determination that the identified drivable area of the vehicle corresponds to the first area.

The processor may be configured to perform the execution of the emergency stop function in response to a signal associated with an operation of an emergency light of the vehicle.

The processor may be configured to determine whether a driving lane of the vehicle, in which of the vehicle is driving, is an outmost lane based on the one or more output signals of the one or more sensors when the emergency stop function is executed, and identify the drivable area of the vehicle when the driving lane of the vehicle is the outmost lane.

The processor may be configured to output another signal to control the vehicle to change the driving lane of the vehicle to the outmost lane in response to determination that the driving lane of the vehicle is not the outmost lane.

The processor may be configured to output another signal to control the vehicle to output a warning notification to a driver of the vehicle when the vehicle has remained stopped in the identified drivable area of the vehicle for a predetermined period of time after the stopping of the vehicle.

The first area where at least one of the parking or the stopping of the vehicle is permitted may include an area other than preset areas where the parking and the stopping of the vehicle are prohibited by traffic regulations.

The first area may include at least one of a third area where the vehicle is allowed to be stopped from a time after the stopping of the vehicle to a time before elapsing a predetermined period of time or a fourth area where the vehicle is allowed to be stopped during a predetermined time period.

The processor may be configured to output another signal to control the vehicle to output a warning notification to a driver of the vehicle after the elapsing of the predetermined period of time or at a predetermined time before the elapsing of the predetermined period of time, after stopping of the vehicle in the third area where the vehicle is allowed to be stopped from the time after the stopping of the vehicle to the time before elapsing the predetermined period of time.

The processor may be configured to output another signal to control the vehicle to output a warning notification to a driver of the vehicle at an end of the predetermined time period or a predetermined time before the end of the predetermined time period, after stopping of the vehicle in the fourth area where the vehicle is allowed to be stopped during the predetermined time period.

The one or more sensors may include at least one camera and a radar, wherein the processor may be configured to determine whether the identified drivable area of the vehicle corresponds to the first area or the second area, based on at least one of object recognition, traffic sign recognition, road marking recognition, or lane recognition from an output signal of the at least one camera, and determination of a presence or absence of an object with a height greater than a predetermined size based on an output signal of the radar.

In accordance with another aspect of the present disclosure, a method of controlling a driving assistance device of a vehicle includes identifying a drivable area of the vehicle based on one or more output signals of one or more sensors in response to execution of an emergency stop function of the vehicle, determining, based on the one or more output signals of the one or more sensors, whether the identified drivable area of the vehicle corresponds to a first area where at least one of parking or stopping of the vehicle is permitted or a second area where the parking and the stopping of the vehicle are prohibited, and outputting a signal to control the vehicle to stop in the identified drivable area corresponding to the first area where at least one of the parking or the stopping of the vehicle is permitted in response to determination that the identified drivable area of the vehicle corresponds to the first area.

The emergency stop function of the vehicle may be executed in response to a signal associated with an operation of an emergency light of the vehicle.

The method may further include determining whether a driving lane of the vehicle, in which the vehicle is driving, is an outmost lane based on the one or more output signals of the one or more sensors when the emergency stop function is executed, wherein the identifying of the drivable area of the vehicle may be performed when the driving lane of the vehicle is the outmost lane.

The method may further include outputting another signal to control the vehicle to change the driving lane of the vehicle to the outmost lane when the driving lane of the vehicle is not the outmost lane.

The method may further include outputting another signal to control the vehicle to output a warning notification to a driver of the vehicle when the vehicle has remained stopped in the identified drivable area of the vehicle for a predetermined period of time after the stopping of the vehicle.

The first area where at least one of the parking or the stopping of the vehicle is permitted may include an area other than preset areas where the parking and the stopping of the vehicle are prohibited by traffic regulations.

The first area may include at least one of a third area where the vehicle is allowed to be stopped from a time after the stopping of the vehicle to a time before elapsing a predetermined period of time or a fourth area where the vehicle is allowed to be stopped during a predetermined time period.

The method may further include outputting another signal to control the vehicle to output a warning notification to a driver of the vehicle after the elapsing of the predetermined period of time or at a predetermined time before the elapsing of the predetermined period of time, after the stopping of the vehicle in the third area where the vehicle is allowed to be stopped from the time after the stopping of the vehicle to the time before elapsing the predetermined period of time.

The method may further include outputting another signal to control the vehicle to output a warning notification to the driver of the vehicle at an end of the predetermined time period or a predetermined time before the end of the predetermined time period, after stopping of the vehicle in the fourth area where the vehicle is allowed to be stopped during the predetermined time period.

Determining whether the identified drivable area of the vehicle corresponds to the first area or the second area may be performed based on at least one of object recognition, traffic sign recognition, road marking recognition, or lane recognition from an output signal of at least one camera included in the one or more sensors, and determination of a presence or absence of an object with a height greater than a predetermined size based on an output signal of a radar included in the one or more sensors.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The same reference numbers indicate the same components throughout the specification. The present specification does not describe all elements of embodiments, and general contents or overlapping contents between the embodiments in the technical field to which the disclosure pertains will be omitted. Terms "unit, module, member, and block" used in the specification may be implemented as software or hardware, and according to the embodiments, each of a plurality of "units, modules, members, and blocks" may be implemented as one component or one "unit, module, member, and block" may also include a plurality of components.

Throughout the specification, when a certain unit is described as being "connected" to another, this includes not only a case of being directly connected thereto but also a case of being indirectly connected thereto, and the indirect connection includes connection through a wireless communication network.

In addition, when a certain unit is described as "including," a certain component, this means further including other components rather than precluding other components unless especially stated otherwise.

Throughout the specification, when a certain member is described as being positioned "on" another, this includes not only a case where the certain member is in contact with another but also a case where other members are present between the two members.

Terms such as first and second are used to distinguish one component from another, and the components are not limited by the above-described terms.

A singular expression includes plural expressions unless the context clearly dictates otherwise.

In each operation, identification symbols are used for convenience of description, and the identification symbols do not describe the sequence of each operation, and each operation may be performed in a different sequence from the specified sequence unless a specific sequence is clearly described in context.

Hereinafter, operating principles and embodiments of the disclosure will be described with reference to the accompanying drawings.

Figure 1:
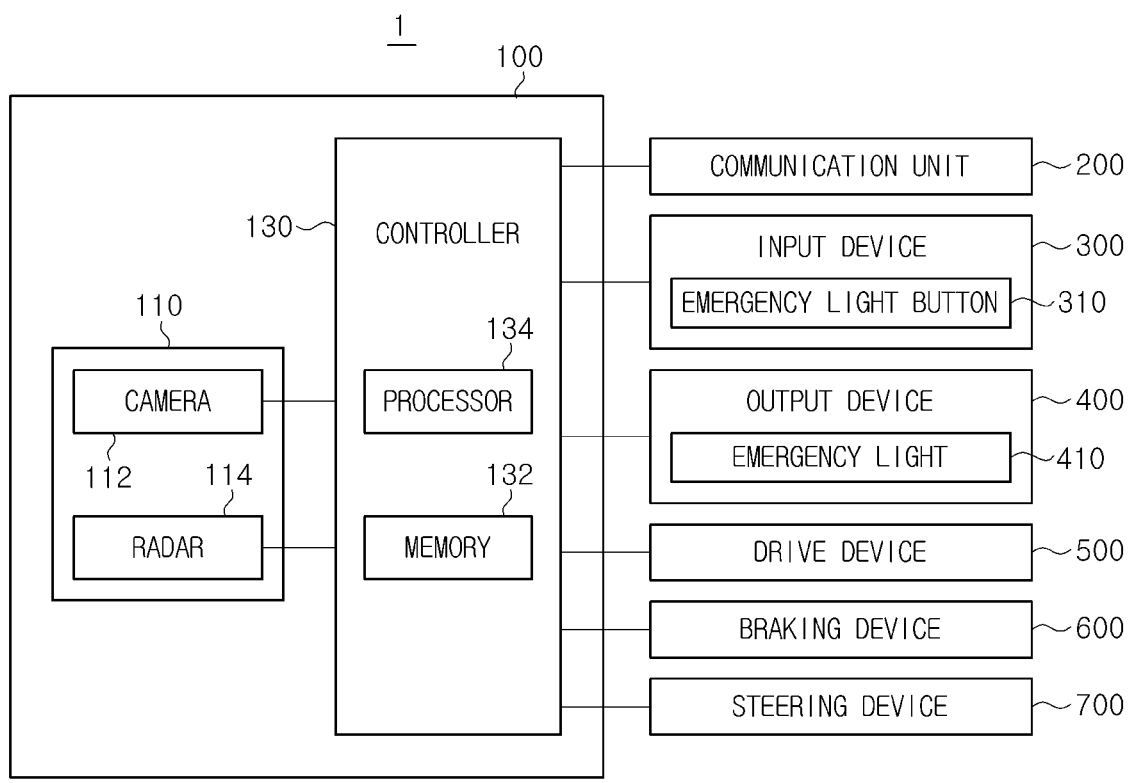
FIG. 1 is a view illustrating a configuration of a vehicle including a driving assistance device according to an embodiment of the disclosure.

FIG. 1 is a view illustrating a configuration of a vehicle including a driving assistance device according to an embodiment of the disclosure.

Referring to FIG. 1, a vehicle 1 may include a driving assistance device 100, a communication unit 200, an input device 300, an output device 400, a drive device 500, a braking device 600, and/or a steering device 700.

For example, components of the vehicle 1 (e.g., the driving assistance device 100, the communication unit 200, the input device 300, the output device 400, the drive device 500, the braking device 600, and/or the steering device 700) may be connected to each other via an in-vehicle communication network and/or a hard wire, as described below.

The driving assistance device 100 may perform driving assistance features for a driver.

For example, the driving assistance device 100 may provide various safety functions to the driver.

For example, the driving assistance device 100 can provide an emergency stop function (also referred to as a stop function) to stop the vehicle 1 in an area where parking or stopping is permitted for the vehicle 1.

Further, for example, the driving assistance device 100 may provide features such as Lane Departure Warning (LDW), Lane Keeping Assist (LKA), High Beam Assist (HBA), Autonomous Emergency Braking (AEB), Traffic Sign Recognition (TSR), Adaptive Cruise Control (ACC), Blind Spot Detection (BSD), and the like.

The driving assistance device 100 may include one or more sensing devices (also referred to as one or more sensors) 110 and/or a controller 130.

The one or more sensing devices 110 and/or controller 130 may be connected to each other via the in-vehicle communication network and/or hard wire, as described later.

At least one of the one or more sensing devices 110 and the controller 130 may not be essential components of the driving assistance device 100. For example, in the driving assistance device 100, at least one of the at least one of the one or more sensing devices 110 and the controller 130 may be omitted.

The one or more sensing devices 110 may be installed on the vehicle 1 and may have a sensing field of view facing outward from the vehicle 1 and provide object data.

The one or more sensing devices 110 may include a camera 112 and/or a radar 114.

The camera 112 may capture a periphery of the vehicle 1 and acquire image data of the periphery of the vehicle 1. For example, the camera 112 may include a plurality of lenses (not shown), an image sensor (not shown), and/or an image processor (not shown).

The radar 114 may emit transmission waves toward the exterior of the vehicle 1 and detect external objects of the vehicle 1 based on reflected waves reflected from the external objects.

Also, although not shown, the one or more sensing devices 110 may further include a lidar.

The controller 130 may control the one or more sensing devices 110, the input device 300, the output device 400, the drive device 500, the braking device 600, and/or the steering device 700.

The controller 130 may include a memory 132 and/or a processor 134.

The memory 132 may store a software program for the driving assistance device 100.

The memory 132 may store programs and/or data for processing each piece of data (e.g., first object data, second object data, data received from an external device and/or input device 300).

The memory 132 may temporarily memorize each piece of data, and may temporarily store the processing results of each data by the processor 134.

The memory 132 may include volatile memory, such as S-RAM and D-RAM, as well as non-volatile memory, such as flash memory, read only memory (ROM), and erasable programmable read only memory (EPROM).

The processor 134 may process each piece of data to provide signals to the respective device for controlling the output device 400, the drive device 500, the braking device 600, and/or the steering device 700. For example, the processor 134 may include a micro controller (MCU).

The processor 134 may assess a collision risk between the vehicle 1 and surrounding objects based on data obtained via one or more of the sensing devices 110, e.g., the camera 112 and/or the radar 114 (e.g., classification, relative position, and relative speed of the surrounding objects). For example, the processor 134 may calculate a time to collision (TTC) (or distance to collision (TTD)) between vehicle 1 and a surrounding object based on the location (distance) and relative speed of the surrounding object from the vehicle 1, and assess the collision risk between the vehicle 1 and the surrounding object based on the time to collision. The processor 134 may determine that a smaller time to collision indicates a higher collision risk.

Based on the collision risk, e.g., the time to collision between the vehicle 1 and the surrounding objects, the processor 134 may select a target object from among the surrounding objects of the vehicle 1.

The processor 134 may generate a driving signal, a braking signal, and/or a steering signal based on the collision risk with the target object. For example, the processor 134 may warn the driver of a collision or send a braking signal to the braking device 600 based on a comparison between the time to collision (TTC) between the vehicle 1 and the target object and a reference time. Further, the processor 134 may transmit a steering signal to the steering device 700 to avoid a collision with the target object based on the comparison between the time to collision (TTC) between the vehicle 1 and the target object and the reference time.

When executing the emergency stop function (also referred to as the stop function) of the vehicle 1, the processor 134 may identify a presence or absence of an area where the vehicle 1 can park and/or stop based on output signals from the one or more sensing devices 110.

For example, the processor 134 may identify a drivable area of the vehicle 1 and determine whether the drivable area of the vehicle 1 corresponds to a first area where parking and/or stopping is permitted or a second area where parking and stopping are prohibited.

The first area may include areas other than areas where parking and stopping are prohibited as predetermined by traffic regulations. For example, the first area may include areas where parking and/or stopping is permitted.

In addition, the second area may be a predetermined parking and/or stopping is prohibited by traffic regulations, so parking the vehicle 1 in the area may result in a fine.

Based on the identification of the first area as an area where parking and/or stopping is permitted, the processor 134 may output a signal that can control the drive device 500, the braking device 600, and/or the steering device 700 to stop the vehicle 1 in that area.

The processor 134 can output a signal that can control the output device 400 and/or the communication unit 200 to output a warning notification if the vehicle 1 continues to be stopped after a predetermined period of time has elapsed since the vehicle 1 was stopped.

For example, the processor 134 may output a signal that causes the output device 400 of the vehicle 1 to output a warning notification, such as a visual, audible, and/or vibration. Additionally, the processor 134 may output a signal that causes a warning notification information to be transmitted to a driver's electronic device (not shown) that is communicatively connected via the communication unit 200.

The communication unit 200 may assist in establishing a wired and/or wireless communication channel between the vehicle 1 and an external device, such as an electronic device (e.g., a smartphone, and/or a smart watch, etc.), and performing communication over the established communication channel, and may include communication circuitry and/or control circuitry to control the behavior of the communication circuitry. For example, the communication unit 200 may include a wireless communication module (e.g., a cellular communication module, a Wi-Fi communication module, a near field communication module, or a global navigation satellite system (GNSS) communication module) and/or a wired communication module, and may communicate with an external device using a corresponding communication module. For example, the near field communication module may include a Bluetooth communication module.

Further, the communication unit 200 may include communication circuits capable of communicating between components (also referred to as devices) of the vehicle 1 via an automotive communication network and/or control circuits capable of controlling the operation of the communication circuits. For example, each of the components included in the vehicle 1 may send and receive data via Ethernet, MOST (Media Oriented Systems Transport), Flexray, CAN (Controller Area Network), LIN (Local Interconnect Network), or the like.

The input device 300 may receive input information in response to user (e.g., driver) operations.

For example, the input device 300 may receive input information to activate an emergency stop function of the driving assistance device 100.

For example, the input device 300 may include an emergency light button 310.

The emergency light button 310 may output a signal for turning on or off an emergency light of the vehicle 1 based on receipt of a user operation.

Additionally, the input device 300 may include a touchscreen and/or a microphone or the like.

The output device 400 may output visual information and/or audible information to enable an occupant of the vehicle 1 and/or a person located on the exterior periphery of the vehicle 1 to view the information.

The output device 400 may include an emergency light 410. For example, as shown in FIG. 1, the emergency light 410 may be connected to the controller 130 and may be turned on or off in response to a control signal from the controller 130, or, as another example, although not shown in FIG. 1, the emergency light 410 may be connected to the emergency light button 310 and may be turned on or off in response to an operation of the emergency light button 310.

For example, the output device 400 may further include lighting devices (e.g., high beams, taillights, and/or sirens, etc.), display devices (e.g., digital cluster, etc.), and/or speakers, etc.

The drive device 500 moves the vehicle 1 and may include, for example, an engine (not shown), an engine management system (EMS) (not shown), a transmission (not shown), and a transmission controller (TCU) (not shown). The engine generates power for the vehicle 1 to travel, and the engine management system may control the engine in response to a driver's intent to accelerate via the accelerator pedal or a request from the driving assistance device 100. The transmission decelerates and transmits the power generated by the engine to the wheels, and the transmission controller may control the transmission in response to a shift command from the driver via the shift lever and/or a request from the driving assistance device 100.

The braking device 600 stops the vehicle 1 and may include, for example, a brake caliper (not shown) and an electronic brake control module (EBCM) (not shown). The brake caliper may utilize friction with the brake disc to slow the vehicle 1 or stop the vehicle 1, and the electronic brake control module may control the brake caliper in response to a driver's intent to brake via the brake pedal and/or a request from the driving assistance device 100. For example, the electronic brake control module may receive a deceleration request from the driving assistance device 100 that includes a deceleration rate, and may electrically or hydraulically control the brake calipers to cause the vehicle 1 to decelerate in reliance on the requested deceleration rate.

The steering device 700 may include an electronic power steering control module (EPS) (not shown) and/or an electronic stability control module (ESC) (not shown). The steering device 700 may change the direction of travel of the vehicle 1, and the electronic steering control module may assist the operation of the steering device 700 in response to a driver's steering intent via the steering wheel to facilitate the driver's operation of the steering wheel. In addition, the electronic steering control module can control the steering device 700 in response to a request from the driving assistance device 100. For example, the electronic steering control module may receive a steering request including a steering torque from the driving assistance device 100 and control the steering device 700 to steer the vehicle 1 in reliance on the requested steering torque. The body attitude control module may assist the operation of the steering device 700 to allow the driver to maintain a lane without losing control of the vehicle 1 during sudden steering maneuvers and/or when traveling on a curved road.

Figure 2:
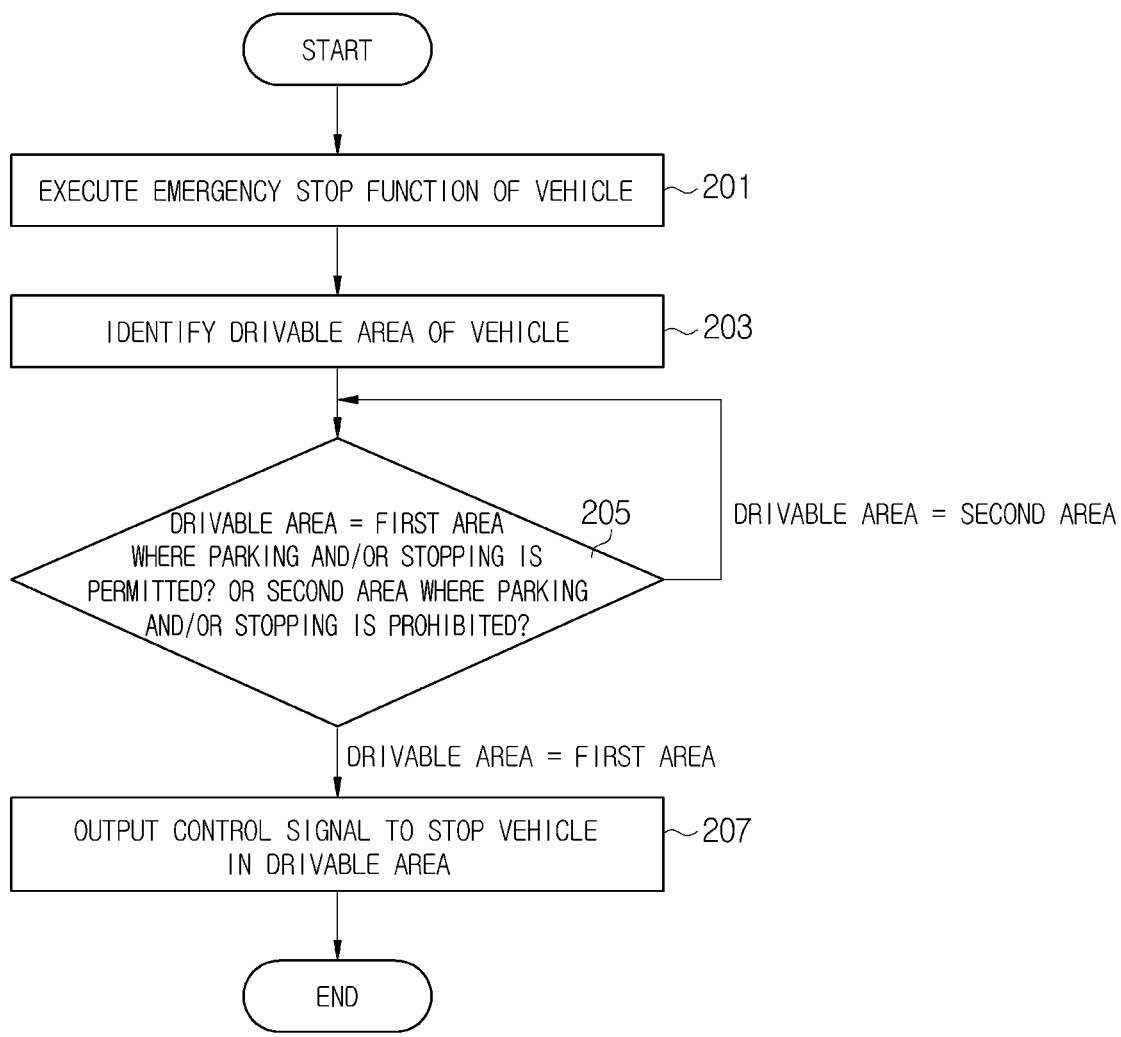
FIG. 2 is a flowchart of the operation of the driving assistance device of the vehicle according to an embodiment of the disclosure.

FIG. 2 is a flowchart of the operation of the driving assistance device 100 (and/or controller 130 (and/or processor 134)) of the vehicle 1, according to an embodiment of the disclosure.

Referring to FIG. 2, the driving assistance device 100 may execute an emergency stop function of the vehicle 1 at step S201.

The driving assistance device 100 may execute the emergency stop function of the vehicle 1 based on an operating signal of the emergency light 410 installed in the vehicle 1.

The driving assistance device 100 may execute the emergency stop function of the vehicle 1 when the driving assistance device 100 detects an operating signal of the emergency light 410 in a situation where the emergency stop function of the driving assistance device 100 is active.

For example, the driving assistance device 100 may activate the emergency stop function based on the driver maneuver. Also, in response to the driver pressing the emergency light 410, an operating signal may be generated to activate the emergency light 410, which may cause the emergency light 410 to be operated.

Based on the execution of the emergency stop function of the vehicle 1, the driving assistance device 100 may identify, based on the output signals of the one or more sensing devices 110, a drivable area of the vehicle 1 in which the vehicle 1 can drive without colliding with surrounding objects at step S203.

For example, the driving assistance device 100 may determine, based on the output signal of the one or more sensing devices 110, whether a driving lane of the vehicle 1 is a rightmost lane using conventional lane recognition techniques when executing the emergency stop function.

If the driving lane of the vehicle 1 is the rightmost lane, the driving assistance device 100 may identify a drivable area of the vehicle 1.

If the travel lane of the vehicle 1 is not the rightmost lane, the driving assistance device 100 may output a signal to control the drive device 500, braking device 600, and/or steering device 700 of the vehicle 1 to cause the vehicle 1 to change the driving lane to the rightmost lane, using conventional lane change logic. For example, the speed of the vehicle 1 may be maintained as the vehicle 1 changes lanes.

Based on the identification of the drivable area, the driving assistance device 100 may determine, based on the output signals of the one or more sensing devices 110, whether the drivable area of the vehicle 1 corresponds to a first area where parking and/or stopping is permitted, or a second area where parking and stopping is prohibited at step S205.

The first area may include areas other than areas where parking and stopping are prohibited as predetermined by traffic regulations. For example, the first area may include areas where parking and/or stopping is permitted.

Furthermore, the second area may be a predetermined parking and/or stopping is prohibited by traffic regulations, so parking the vehicle 1 in the area may result in a fine or the like.

Figure 3:
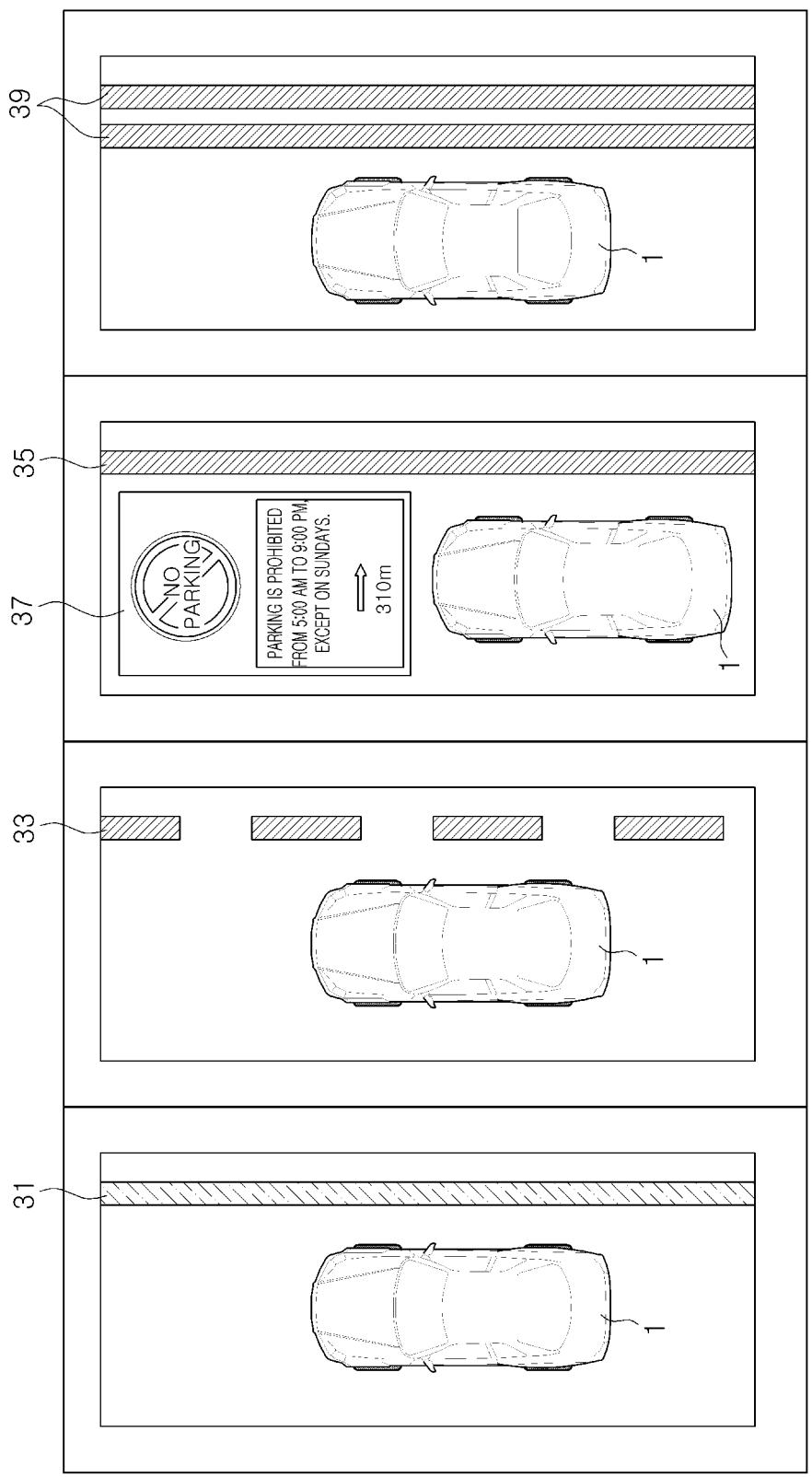
FIG. 3 is a view illustrating an example of a lane utilized for determining areas where parking and/or stopping is permitted or where parking and stopping are prohibited, according to an embodiment of the disclosure.

For example, the first area, where parking and/or stopping is permitted, and the second area, where parking and stopping are prohibited, may be distinguished by lanes marked on the road surface, as shown in FIG. 3.

FIG. 3 is a view illustrating an example of a lane utilized for determining areas where parking and/or stopping is permitted or where parking and stopping are prohibited, according to an embodiment of the disclosure.

For example, as shown in FIG. 3, parking and stopping may be possible if the rightmost lane of the vehicle 1 is a solid white line 31.

If the rightmost lane of the vehicle 1 is a yellow dashed line 33, parking is prohibited, but stopping may be possible.

If the rightmost lane of the vehicle 1 is a solid yellow line 35, both parking and stopping may be prohibited, but parking and/or stopping may be permitted during predetermined days and/or predetermined hours if there is a supplementary sign 37 that provides information that parking and/or stopping is permitted during predetermined days and/or predetermined hours (or that parking and/or stopping is not allowed during predetermined days and/or predetermined hours).

If the rightmost lane of the vehicle 1 is a yellow double solid line 39, both parking and stopping may be prohibited.

Figure 4:
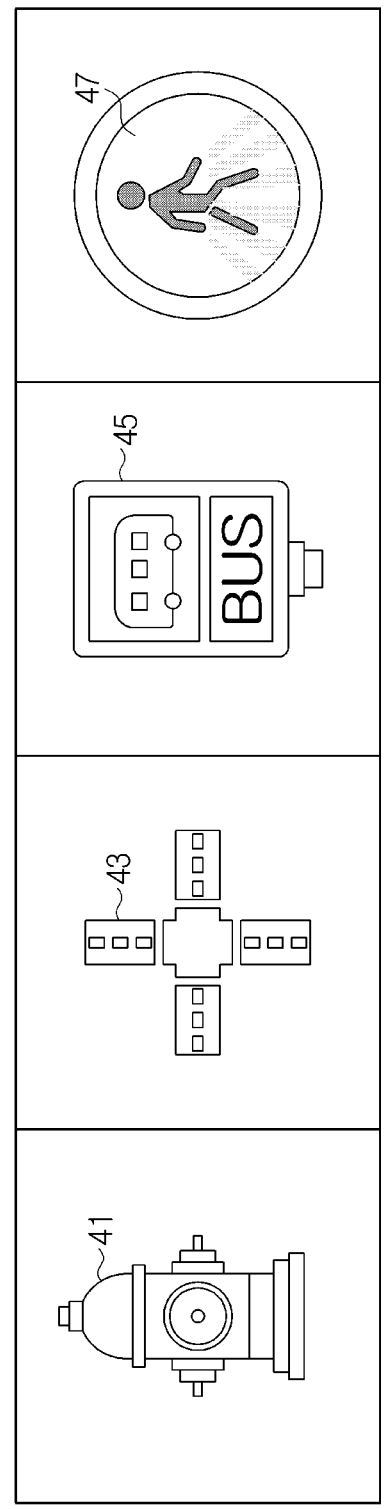
FIG. 4 is a view illustrating an example of information utilized for determining areas where parking and/or stopping is prohibited, according to an embodiment of the disclosure.

For example, a first area where parking and/or stopping is permitted, and a second area where parking and stopping are prohibited, may be distinguished by distance from predetermined objects (e.g., fire hydrants, stop signs, etc.) and/or by information displayed on the road surface of a predetermined roadway (e.g., intersection markings, pedestrian crossing markings, child protection area markings, etc.), as shown in FIG. 4.

FIG. 4 is a view illustrating an example of information utilized for determining areas where parking and/or stopping is prohibited, according to an embodiment of the disclosure.

For example, as shown in FIG. 4, parking and stopping may be prohibited in an area within a predetermined distance (e.g., 5 meters) from a fire hydrant 41.

Parking and stopping may be prohibited within a predetermined distance (e.g., 5 meters) from the edge of an intersection 43 or a street corner.

Parking and stopping may be prohibited in an area within a predetermined distance (e.g., 10 meters) from a stop sign 45 and/or from a stop marking line on the road surface of a roadway.

Parking and stopping may be prohibited on pedestrian crossings 47 or in areas that encroach on stop lines.

Additionally, parking and stopping may be prohibited in child protection areas.

The driving assistance device 100 may perform an operation of step S207 when the drivable area of the vehicle 1 corresponds to the first area, and may otherwise perform an operation of step S205 again.

The driving assistance device 100 may output a signal to the driving device 500, the braking device 600, and/or the steering device 700 that may control the driving device 500, the braking device 600, and/or the steering device 700 of the vehicle 1 such that the vehicle 1 is stopped in the drivable area of the vehicle 1 at step S207.

Further to the embodiment of FIG. 2 described above, the driving assistance device 100 may output a signal to control the output device 400 and/or the communication unit 200 of the vehicle 1 to provide a warning notification to the driver to make the driver aware of the vehicle 1 when the vehicle 1 remains stopped after a predetermined period of time after stopping of the vehicle 1.

Accordingly, the output device 400 of the vehicle 1 may output a warning notification, such as a visual, audible, and/or vibration notification. In addition, warning notification information may be provided to an electronic device (not shown) of the driver communicatively connected via the communication unit 200, and the electronic device may output the warning notification visually, audibly, and/or vibrationally, etc. through the output device of the electronic device.

Furthermore, the first area in the embodiment of FIG. 2 described above may include a third area where the vehicle 1 may stopped from a time after stopping of the vehicle 1 to before elapsing a predetermined first period of time, and/or a fourth area where stopping is possible during a predetermined time period.

However, if the predetermined first period of time elapses after parking or stopping of the vehicle 1 in the third area, the third area may be changed to be included in the second area instead of the first area.

Furthermore, the fourth area in a time period other than the predetermined first period of time may be changed to be included in the second area instead of the first area.

Accordingly, the driving assistance device 100 may determine that the fourth area is included in the second area when determining whether the drivable area of the vehicle 1 corresponds to the first area or the second area if the drivable area corresponds to the fourth area but the current time is not included in the predetermined time period of the fourth area.

Further, the driving assistance device 100 may output a signal to control at least one of the output device 400 or the communication unit 200 of the vehicle 1 to provide a warning notification to the driver of the vehicle 1 at the predetermined first period of time or a predetermined second period of time before the predetermined first period of time, after stopping of the vehicle 1 in the third area.

Further, the driving assistance device 100 may output a signal to control at least one of the output device 400 or the communication unit 200 of the vehicle 1 to provide a warning notification to the driver of the vehicle 1 at an end of the predetermined time period or a predetermined time before the end of the predetermined time period, after stopping of the vehicle 1 in the fourth area. For example, a time when the vehicle 1 is stopped in the fourth area is included in the predetermined time period.

Furthermore, in addition to the embodiment of FIG. 2 described above, the driving assistance device 100 may perform the drivable area identification operation of step S203 again after a predetermined time period has elapsed if the drivable area has not been identified. In addition, the driving assistance device 100 may output a signal to control the output device 400 of the vehicle 1 to output the information so the driver of the vehicle 1 can recognize that there is currently no drivable area.

In addition, the lanes utilized to determine areas where parking and/or stopping is permitted in the embodiment of FIG. 3 above, and the information utilized to determine areas where parking and stopping is prohibited in the embodiment of FIG. 4 above, are merely one embodiment and may be adapted to meet the traffic laws and regulations of each country.

Figure 5:
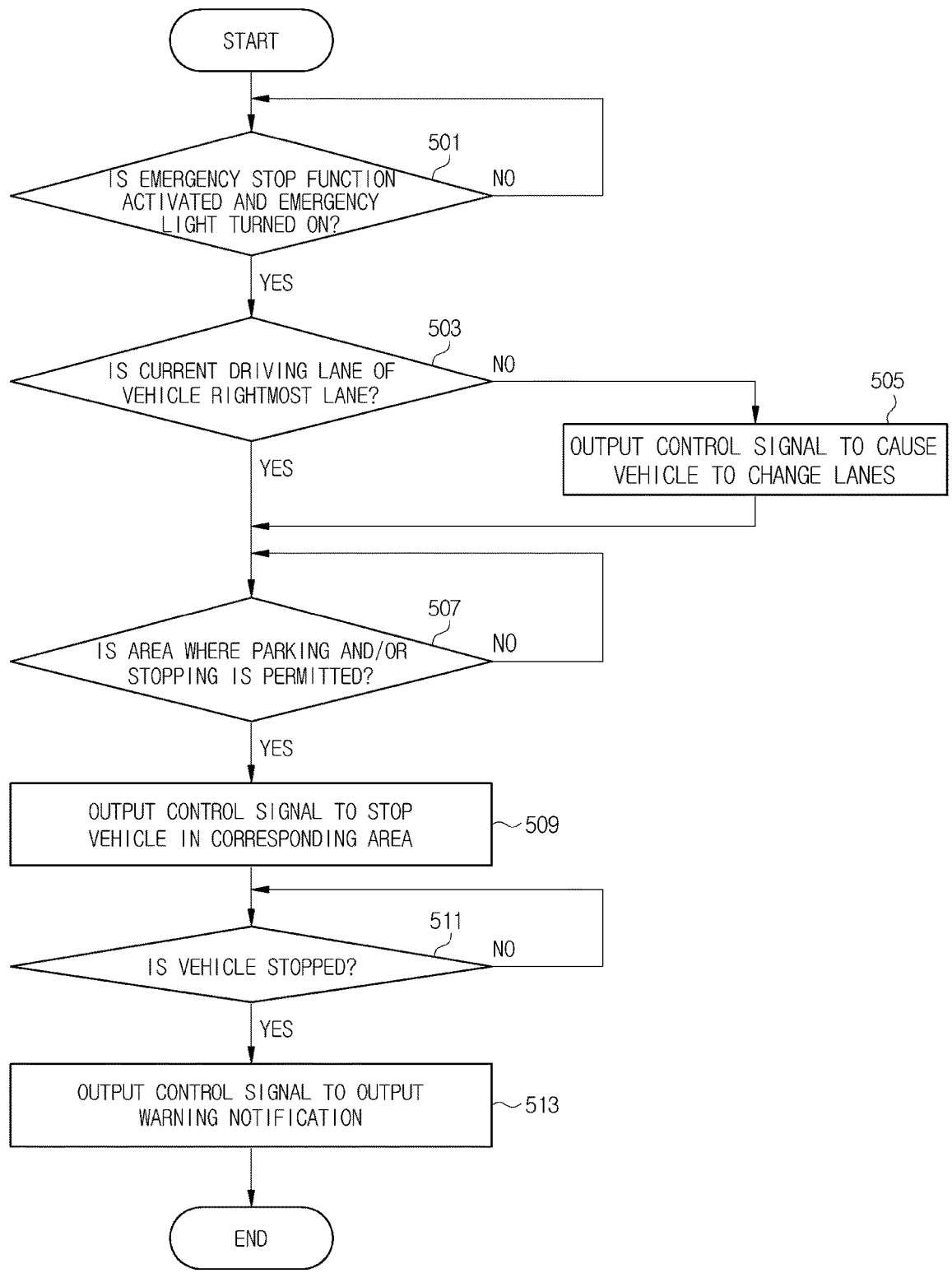
FIG. 5 is a flowchart of the operation of the driving assistance device of the vehicle according to an embodiment of the disclosure.

FIG. 5 is a flowchart of the operation of the driving assistance device 100 (and/or controller 130 (and/or processor 134)) of the vehicle 1 according to an embodiment of the disclosure.

Referring to FIG. 5, the driving assistance device 100 may identify whether the emergency stop function has been activated and the emergency light 410 have been turned on at step S501.

For example, the driving assistance device 100 may activate the emergency stop function, which may allow the vehicle 1 to perform the emergency stop function while the vehicle 1 is traveling, based on a driver operation via the input device 300.

Further, the driving assistance device 100 may identify whether the emergency light 410 is turned on while the emergency stop function is activated. For example, the driving assistance device 100 may identify that the emergency light 410 is on based on identifying an operating signal of the emergency light 410.

The driving assistance device 100 may perform an operation of step S503 if the emergency light 410 is on, and otherwise perform the operation of step S501 again.

The driving assistance device 100 may determine whether the current driving lane of the vehicle 1 is the rightmost lane based on the output signal of the one or more sensing devices 110 at step S503.

The driving assistance device 100 may perform an operation of step S507 if the current driving lane of the vehicle 1 is the rightmost lane, and may otherwise perform an operation of step S505.

The driving assistance device 100 may output a control signal to control the drive device 500, the braking device 600, and/or the steering device 700 to cause the vehicle 1 to change lanes to the rightmost lane at step S505.

For example, the driving assistance device 100 may output a control signal to cause the vehicle 1 to change lanes using conventional lane change techniques.

The driving assistance device 100 may determine whether an area (also referred to as a first area) exists where the vehicle 1 can park and/or stop at step S507.

For example, the determination of an area where parking and/or stopping is permitted may be based on data obtained via the one or more sensing devices 110, such as data obtained via the camera 112 facing the front of the vehicle 1 and/or data obtained via a radar 114.

The driving assistance device 100 may identify a drivable area where the vehicle 1 can drive without collision, and may determine that the drivable area is a first area where parking and/or stopping of the vehicle 1 is permitted.

For example, the driving assistance device 100 may identify a drivable area when the driving lane of the vehicle 1 is the rightmost lane.

Additionally, the driving assistance device 100 may identify a drivable area after causing the vehicle 1 to move into the drivable area if the driving lane of the vehicle 1 is not the rightmost lane.

The driving assistance device 100 may determine that the drivable area is a first area if, while the driving lane of the vehicle 1 is the rightmost lane, the right side of the vehicle 1 is a drivable area, and the lane to the right of the vehicle 1 marked on the road surface of the roadway is a solid white line, a dashed yellow line, or a solid yellow line.

For example, the driving assistance device 100 may recognize a lane, e.g., the right lane of the vehicle 1, using conventional lane recognition techniques, based on data acquired via the camera 112.

The driving assistance device 100 may determine, based on data acquired via the radar 114, whether an object with a height greater than a predetermined size is present in the drivable area.

The driving assistance device 100 may determine that the drivable area is a first area if there are no objects with a height greater than the predetermined size. Further, the driving assistance device 100 may determine that the drivable area is a second area if there are objects with a height greater than the predetermined size.

The driving assistance device 100 may perform object recognition, traffic sign recognition, road marking recognition, and/or lane recognition based on the data obtained through the camera 112 for the drivable area of the vehicle 1.

The driving assistance device 100 may determine, through object recognition techniques, that the drivable area corresponds to the second area where parking and stopping of the vehicle 1 is prohibited upon recognition of a fire hydrant within the drivable area of the vehicle 1 and/or a predetermined distance from the drivable area of the vehicle 1.

The driving assistance device 100 may determine that the drivable area corresponds to the second area upon recognizing, via traffic sign recognition technology, the presence of a bus stop sign within the drivable area of the vehicle 1 and/or a predetermined distance from the drivable area of the vehicle 1.

The driving assistance device 100 may determine that the drivable area corresponds to the second area when the driving assistance device 100 recognizes, through information marked on the road surface and/or traffic sign recognition technology, the presence of a pedestrian crossing within the drivable area of the vehicle 1 and/or a predetermined distance from the drivable area of the vehicle 1.

The driving assistance device 100 may determine that the drivable area corresponds to the second area when the driving assistance device 100 recognizes, through lane recognition technology, that the lane to the right of the vehicle 1 is a double solid yellow line when the right side of the vehicle 1 is in the drivable area.

The driving assistance device 100 may recognize, for example through information marked on the road surface and/or traffic sign recognition technology, that the drivable area is a child protection area, and accordingly determine that the drivable area corresponds to the second area.

The driving assistance device 100 may perform an operation of step S509 if an area exists where parking and/or stopping of the vehicle 1 is permitted, and otherwise perform the operation of step S507 again.

The driving assistance device 100 may output a control signal to cause the vehicle 1 to stop in the area where parking and/or stopping of the vehicle 1 is permitted at step S509.

For example, the control signal may be provided to the drive device 500, the braking device 600, and/or the steering device 700 of the vehicle 1 as a signal to control the drive device 500, the braking device 600, and/or the steering device 700.

Following the output of the control signal, the driving assistance device 100 may identify whether the vehicle 1 is stopped at step S511.

The driving assistance device 100 may perform an operation of step S513 if the vehicle 1 is stopped, and otherwise perform the operation of step S511 again.

The driving assistance device 100 may output a control signal to control the output device 400 and/or the communication unit 200 such that the warning notification is output at step S513.

The driving assistance device 100 may output a control signal for outputting the warning notification if the vehicle 1 continues to be stopped after a predetermined period of time has elapsed since the vehicle 1 was stopped, so the driver is aware of that fact.

For example, the control signal may include a control signal that causes the output device 400 to output a warning notification, such as a visual, audible, and/or vibration, and/or a control signal that causes the communication unit 200 to transmit the warning notification information to a communicatively connected electronic device of the driver. For example, the electronic device may output the warning notification, such as a visual, audible, and/or vibration, upon receipt of the control signal via the communication unit 200.

A driving assistance device and controlling method thereof, according to one aspect of the present disclosure, may assist a driver in operating a vehicle by providing techniques for automatically stopping the vehicle in a parking and/or stopping area in the event of a situation that requires the vehicle to stop urgently.

For example, the driving assistance device and controlling method thereof can safely cause a vehicle to stop in a situation where the vehicle needs to be stopped urgently but the driver is unable to stop the vehicle.

Also, the driving assistance device and controlling method can quickly process to control the vehicle with limited resources to control the vehicle in the event of a situation that requires the vehicle to stop urgently.

Furthermore, the driving assistance device and control method according to one aspect of the present disclosure may provide legal parking and/or stopping information to the driver who is unaware of the laws regarding prohibited parking and/or stopping areas, thereby preventing the driver from violating the laws in advance.

Furthermore, a driving assistance device and controlling method thereof according to one aspect of the present disclosure may provide a warning notification to guide the driver to avoid violating the law if the parking and/or stopping area has a time limit for parking and/or stopping.

In one aspect, the disclosed embodiments may be implemented in the form of a recording medium storing instructions executable by a computer. The instructions may be stored in the form of program code, which, when executed by a processor, may generate program modules to perform the operations of the disclosed embodiments. The recording medium may be implemented as a computer-readable recording medium.

A computer-readable recording medium includes any type of recording medium on which instructions that can be decoded by a computer are stored. For example, read only memory (ROM), random access memory (RAM), magnetic tape, magnetic disk, flash memory, optical data storage, etc.

The device-readable storage medium may be provided in the form of a non-transitory storage medium. In this context, "non-transitory" only means that the storage medium is a tangible device and does not contain signals (e.g., electromagnetic waves), and the term does not distinguish between cases where data is stored on the storage medium on a semi-permanent basis and cases where it is stored on a temporary basis. For example, a "non-transitory storage medium" may include a buffer in which data is temporarily stored.

Embodiments of the present disclosure have been described above with reference to the accompanying drawings. One of ordinary skill in the art to which this invention belongs will understand that the present disclosure may be practiced in other forms than the disclosed embodiments without altering the technical ideas or essential features of the invention. The disclosed embodiments are exemplary and should not be construed as limiting.

What is claimed is:

1. A driving assistance device comprising:
   one or more sensors included in a vehicle, and having a sensing field of view facing outward from the vehicle; and
   a processor operably connected to the one or more sensors,
   wherein the processor is configured to:
   identify a drivable area of the vehicle based on one or more output signals of the one or more sensors in response to execution of an emergency stop function of the vehicle;
   determine, based on the one or more output signals of the one or more sensors, whether the identified drivable area of the vehicle corresponds to a first area where at least one of parking or stopping of the vehicle is permitted or a second area where the parking and the stopping of the vehicle are prohibited; and
   output a signal to control the vehicle to stop in the identified drivable area corresponding to the first area where at least one of the parking or the stopping of the vehicle is permitted in response to determination that the identified drivable area of the vehicle corresponds to the first area.

2. The driving assistance device of claim 1,
   wherein the processor is configured to perform the execution of the emergency stop function in response to a signal associated with an operation of an emergency light of the vehicle.

3. The driving assistance device of claim 1,
   wherein the processor is configured to:
   determine whether a driving lane of the vehicle, in which the vehicle is driving, is an outmost lane based on the one or more output signals of the one or more sensors when the emergency stop function is executed; and
   identify the drivable area of the vehicle when the driving lane of the vehicle is the outmost lane.

4. The driving assistance device of claim 3,
   wherein the processor is configured to output another signal to control the vehicle to change the driving lane of the vehicle to the outmost lane in response to determination that the driving lane of the vehicle is not the outmost lane.

5. The driving assistance device of claim 1,
   wherein the processor is configured to output another signal to control the vehicle to output a warning notification to a driver of the vehicle when the vehicle has remained stopped in the identified drivable area of the vehicle for a predetermined period of time after the stopping of the vehicle.

6. The driving assistance device of claim 1, wherein the first area where at least one of the parking or the stopping of the vehicle is permitted includes an area other than preset areas where the parking and the stopping of the vehicle are prohibited by traffic regulations.

7. The driving assistance device of claim 6, wherein the first area includes at least one of a third area where the vehicle is allowed to be stopped from a time after the stopping of the vehicle to a time before elapsing a predetermined period of time or a fourth area where the vehicle is allowed to be stopped during a predetermined time period.

8. The driving assistance device of claim 7, wherein the processor is configured to output another signal to control the vehicle to output a warning notification to a driver of the vehicle after the elapsing of the predetermined period of time or at a predetermined time before the elapsing of the predetermined period of time, after the stopping of the vehicle in the third area where the vehicle is allowed to be stopped from the time after the stopping of the vehicle to the time before elapsing the predetermined period of time.

9. The driving assistance device of claim 7, wherein the processor is configured to output another signal to control the vehicle to output a warning notification to a driver of the vehicle at an end of the predetermined time period or a predetermined time before the end of the predetermined time period, after the stopping of the vehicle in the fourth area where the vehicle is allowed to be stopped during the predetermined time period.

10. The driving assistance device of claim 1, wherein:
the one or more sensors include at least one camera and a radar,
the processor is configured to determine whether the identified drivable area of the vehicle corresponds to the first area or the second area, based on at least one of object recognition, traffic sign recognition, road marking recognition, or lane recognition from an output signal of the at least one camera, and determination of a presence or absence of an object with a height greater than a predetermined size based on an output signal of the radar.

11. A method of controlling a driving assistance device of a vehicle, the method comprising:
identifying a drivable area of the vehicle based on one or more output signals of one or more sensors in response to execution of an emergency stop function of the vehicle;
determining, based on the one or more output signals of the one or more sensors, whether the identified drivable area of the vehicle corresponds to a first area where at least one of parking or stopping of the vehicle is permitted or a second area where the parking and the stopping of the vehicle are prohibited; and
outputting a signal to control the vehicle to stop in the identified drivable area corresponding to the first area where at least one of the parking or the stopping of the vehicle is permitted in response to determination that the identified drivable area of the vehicle corresponds to the first area.

12. The method of claim 11, wherein the emergency stop function of the vehicle is executed in response to a signal associated with an operation of an emergency light of the vehicle.

13. The method of claim 11, further comprises:
determining whether a driving lane of the vehicle, in which the vehicle is driving, is an outmost lane based on the one or more output signals of the one or more sensors when the emergency stop function is executed,
wherein the identifying of the drivable area of the vehicle is performed when the driving lane of the vehicle is the outmost lane.

14. The method of claim 13, further comprises:
outputting another signal to control the vehicle to change the driving lane of the vehicle to the outmost lane when the driving lane of the vehicle is not the outmost lane.

15. The method of claim 11, further comprises:
outputting another signal to control the vehicle to output a warning notification to a driver of the vehicle when the vehicle has remained stopped in the identified drivable area of the vehicle for a predetermined period of time after the stopping of the vehicle.

16. The method of claim 11, wherein the first area where at least one of the parking or the stopping of the vehicle is permitted includes an area other than preset areas where the parking and the stopping of the vehicle are prohibited by traffic regulations.

17. The method of claim 16, Wherein the first area includes at least one of a third area where the vehicle is allowed to be stopped from a time after the stopping of the vehicle to a time before elapsing a predetermined period of time or a fourth area where the vehicle is allowed to be stopped during a predetermined time period.

18. The method of claim 17, further comprises:
outputting another signal to control the vehicle to output a warning notification to a driver of the vehicle after the elapsing of the predetermined period of time or at a predetermined time before the elapsing of the predetermined period of time, after the stopping of the vehicle in the third area where the vehicle is allowed to be stopped from the time after the stopping of the vehicle to the time before elapsing the predetermined period of time.

19. The method of claim 17, further comprises:
outputting another signal to control the vehicle to output a warning notification to the driver of the vehicle at an end of the predetermined time period or a predetermined time before the end of the predetermined time period, after the stopping of the vehicle in the fourth area where the vehicle is allowed to be stopped during the predetermined time period.

20. The method of claim 11, wherein the determining of whether the identified drivable area of the vehicle corresponds to the first area or the second area is performed based on at least one of object recognition, traffic sign recognition, road marking recognition, or lane recognition from an output signal of at least one camera included in the one or more sensors, and determination of a presence or absence of an object with a height greater than a predetermined size based on an output signal of a radar included in the one or more sensors.

* * * * *